Figure 1:
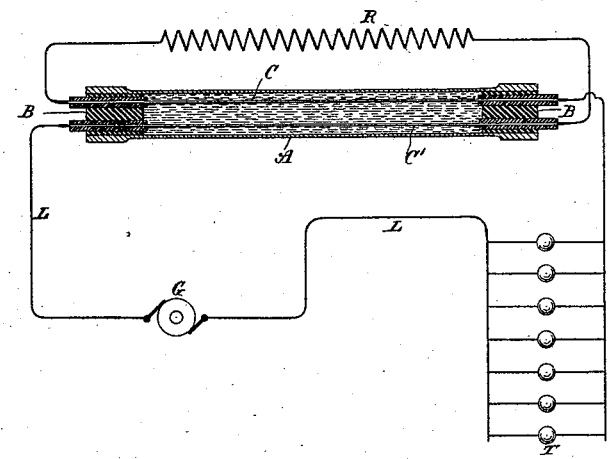

(No Model.)

N. TESLA.
ELECTRICAL METER.

No. 455,068.            Patented June 30, 1891.

Witnesses:
Raphael Netter
Ernest Hopkinson

Inventor
Nikola Tesla
by
Duncan & Page.
Attorneys.

UNITED STATES PATENT OFFICE.

NIKOLA TESLA, OF NEW YORK, N. Y.

ELECTRICAL METER.

SPECIFICATION forming part of Letters Patent No. 455,068, dated June 30, 1891.

Application filed March 27, 1891. Serial No. 386,666. (No model.)

*To all whom it may concern:*

Be it known that I, NIKOLA TESLA, a subject of the Emperor of Austria, from Smiljan, Lika, border country of Austria-Hungary, and a resident of New York, in the county and State of New York, have invented certain new and useful Improvements in Electrical Meters, of which the following is a specification, reference being had to the drawings accompanying and forming a part of the same.

My invention pertains to methods of and apparatus for estimating the electrical energy that has been expended in an electric circuit or any given portion of the same.

The principle of the invention is embodied in any form of apparatus in which a conductor immersed in an electrolytic solution is so arranged that metal may be deposited upon it or taken away from it in such manner that its electrical resistance is varied in a definite proportion to the strength of the current the energy of which is to be computed, whereby such variation in resistance may serve as a measure of the energy or may be utilized in various well-understood ways to bring into action suitable automatic registering mechanism when the resistance exceeds or falls below predetermined limits.

In carrying out my invention I prefer to employ an electrolytic cell, through which extend two conductors parallel and in close proximity to each other. I connect these conductors in series through a resistance, but in such manner that there is an equal difference of potential between them throughout their entire extent. The free ends or terminals of the conductors are connected either in series in the circuit supplying the current to the lamps or other devices or in parallel to a resistance in the said circuit and in series with the translating devices. Under such circumstances a current passing through the conductors establishes a difference of potential between them which is proportional to the strength of the current, in consequence of which there is a leakage of current from one conductor to the other across the solution. The strength of this leakage current is proportional to the difference of potential, and, therefore, in proportion to the strength of the current passing through the conductors. Moreover, as there is a constant difference of potential between the two conductors throughout the entire extent that is exposed to the solution, the current density through such solution is the same at all corresponding points, and hence the deposit is uniform along the whole of one of the conductors, while the metal is taken away uniformly from the other. The resistance of one conductor is by this means diminished, while that of the other is increased both in proportion to the strength of the current passing through the conductors. From such variation in the resistance of either or both of the conductors forming the positive and negative electrodes of the cell the current energy expended may be readily computed.

Other modified arrangements of the conductors are contemplated, as will be understood from the following description and reference to the drawings.

The figures are diagrams showing the meter in operative relations to a working-circuit and under slightly-modified arrangements.

In Fig. 1, G designates a suitable direct-current generator. L L are the conductors of the circuit extending therefrom and including and supplying lamps or other translating devices T. A is a tube, preferably of glass, the ends of which are sealed, as by means of insulating plugs or caps B B. C C' are two conductors extending through the tube A, their ends passing out through the plugs B to terminals thereon. These conductors may be corrugated or formed in other proper ways to offer the desired electrical resistance. R is a resistance connected in series with the two conductors C C', which by their free terminals are connected up in the circuit of one of the conductors L.

The method of using this device and computing by means thereof the energy of the current will be readily understood. First, the resistances of the two conductors C C', respectively, are accurately measured and noted. Then a known current is passed through the instrument for a given time, and by a second measurement the increase and diminution of the resistances of the two conductors respectively taken. From these data the constant is obtained—that is to say, for example, the increase of resistance of one conductor or the diminution of the resistance of the other per lamp-hour. These two measurements evidently serve as a check, since the gain of one conductor should equal the loss of the other. A further check is afforded by measuring both wires in series with the resistance, in which case the resistance of the whole should remain constant.

Figure 2:
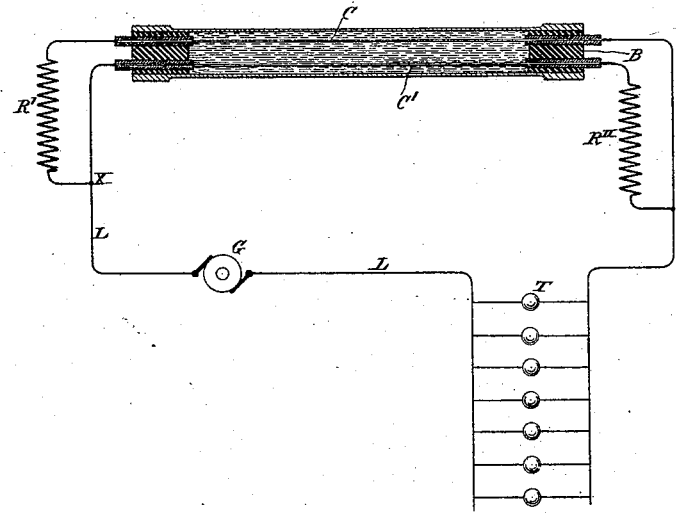

In Fig. 2 the conductors C C' are connected in parallel, the current device at X passing in one branch first through a resistance R' and then through conductor C, while in the other branch it passes first through conductor C', and then through resistance R''. The resistances R' R'' are equal, as also are the resistances of the conductors C C'. It is, moreover, preferable that the respective resistances of the conductors C C' should be a known and convenient fraction of the coils or resistances R' R''. It will be observed that in the arrangement shown in Fig. 2 there is a constant potential difference between the two conductors C C' throughout their entire length.

It will be seen that in both cases illustrated the proportionality of the increase or decrease of resistance to the current strength will always be preserved, for what one conductor gains the other loses, and the resistances of the conductors C C' being small as compared with the resistances in series with them. It will be understood that after each measurement or registration of a given variation of resistance in one or both conductors the direction of the current should be changed or the instrument reversed, so that the deposit will be taken from the conductor which has gained and added to that which has lost. This principle is capable of many modifications. For instance, since there is a section of the circuit—to wit, the conductor C or C'—that varies in resistance in proportion to the current strength, such variation may be utilized, as is done in many analogous cases, to effect the operation of various automatic devices, such as registers. I prefer, however, for the sake of simplicity to compute the energy by measurements of resistance.

The chief advantages of this invention are, first, that it is possible to read off directly the amount of the energy expended by means of a properly-constructed ohm-meter and without resorting to weighing the deposit; second, it is not necessary to employ shunts, for the whole of the current to be measured may be passed through the instrument; third, the accuracy of the instrument and correctness of the indications are but slightly affected by changes in temperature. In addition to these advantages the invention possesses the merit of economy in the waste of energy and simplicity, compactness, and cheapness in construction.

What I claim is—

1. The method of computing the amount of electrical energy expended in a given time in an electric circuit, which consists in maintaining by the current a potential difference between two conductors in an electrolytic solution uniform throughout the whole extent of such conductors exposed to the solution and measuring the variation of the resistance in one or both of said conductors due to the gain or loss of metal by electro-deposition, as set forth.

2. The combination, with an electric circuit, of a meter composed of an electrolytic cell and two conductors passing through the same, the said conductors being in or connected with the main circuit and so that a potential difference uniform throughout the whole extent exposed to the solution will be maintained between them, as set forth.

3. The combination, with an electric circuit containing translating devices, of a meter composed of an electrolytic cell and two conductors passing through the same and connected in series with the translating devices, and one or more resistances connected therewith for establishing a potential difference between the two conductors through the solution of the cell, as set forth.

4. An electrical meter consisting of an electrolytic cell, two parallel conductors extending through the same, the said conductors being connected together in series through a resistance and having terminals at their free ends for connection with a circuit, these parts being combined in the manner substantially as set forth.

5. An electric meter consisting of a tubular cell containing an electrolytic solution and closed at the ends, two parallel conductors extending through the cell, a resistance-connection between the end of one conductor and the opposite end of the other, and terminals for the remaining ends of the respective conductors, these parts being combined as set forth.

NIKOLA TESLA.

Witnesses:
ROBT. F. GAYLORD,
PARKER W. PAGE.